United States Patent [19]

Ludman et al.

[11] Patent Number: 4,558,951
[45] Date of Patent: Dec. 17, 1985

[54] FIBER FOURIER SPECTROMETER

[76] Inventors: Jacques E. Ludman, 98 Old Lowell Rd., Westford, Mass. 01731; John L. Sampson, 8 Bedford St., Lexington, Mass. 02173; Henry J. Caulfield, 385 Old Beaverbrook, Nagog Woods, Mass. 01718

[21] Appl. No.: 465,229
[22] Filed: Feb. 9, 1983
[51] Int. Cl.[4] ............................................. G01J 3/45
[52] U.S. Cl. ...................................... 356/346; 356/345
[58] Field of Search ............... 356/345, 346, 354, 355; 250/227; 350/96.14

[56] References Cited

U.S. PATENT DOCUMENTS

| | | | |
|---|---|---|---|
| 3,493,288 | 2/1970 | Kaufman et al. | 350/163 |
| 3,585,705 | 6/1971 | Allan | 29/412 |
| 4,089,586 | 5/1978 | French et al. | 350/96.30 |
| 4,095,899 | 6/1978 | Vanasse | 356/106 |
| 4,147,979 | 4/1979 | Baues et al. | 324/244 |
| 4,505,588 | 3/1985 | Ludman et al. | 356/354 |

OTHER PUBLICATIONS

Leonberger, "High-Speed Operation of LiNbO3 Electro-Optic Interferometric Waveguide Modulators", Optics Letters, vol. 5, No. 7, pp. 312-314, Jul. 1980.
Iiyama et al., "Optical Field Mapping Using Single-Mode Optical Fibers", Applied Optics, vol. 17, No. 12, pp. 1965-1971, Jun. 1978.
Born et al., Principles of Optics, Second (Revised) Edition, p. 256, The MacMillan Company, New York, 1964.
H. F. Dobele et al., "Application of a Fabry-Perot Spectrometer to the Measurement of Spectral Line Shifts Much Smaller than Line Width", Applied Optics, vol. 15, No. 1, Jan. 1976, pp. 69-72.

Primary Examiner—Davis L. Willis
Assistant Examiner—Matthew W. Koren
Attorney, Agent, or Firm—Donald J. Singer; Jacob N. Erlich

[57] ABSTRACT

A fiber Fourier spectrometer having a focusing element, a beamsplitter, a pair of monomode optical fibers, a block of electro-optic material defining a pair of optical paths and means for controlling the effective length of one of the optical paths. A source of electromagnetic radiation is focused through and reflected by the beamsplitter into the pair of monomode fibers, respectively, and from there to the respective optical paths within the electro-optic block of material. The outputs of the two optical paths are combined and received by an intensity detector. Varying the effective path length of one of the optical paths alters the phase of the beam passing therethrough. Because the source of electromagnetic radiation has different wavelengths, the spectral components of the source are phase retarded by different amounts as they pass through the electro-optic material and can therefore be analyzed by a conventional Fourier spectroscopy technique.

10 Claims, 1 Drawing Figure

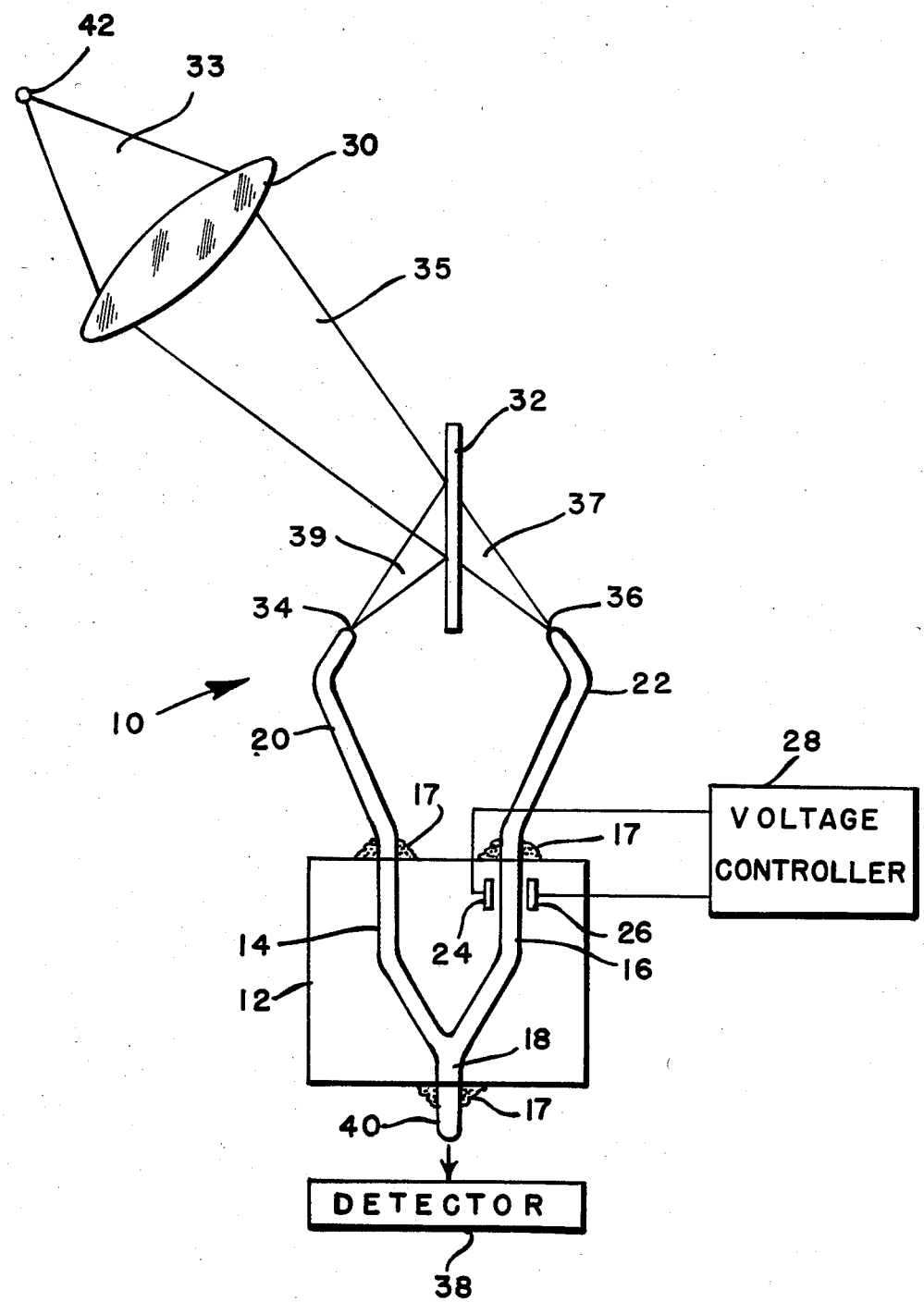

FIBER FOURIER SPECTROMETER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to the field of spectroscopy, and, more particularly to a fiber Fourier spectrometer capable of providing spectroscopic measurements of wavelengths and intensities of electromagnetic radiation.

Spectroscopy is concerned with the production, measurement and interpretation of electromagnetic spectra arising from either emission or absorption of radiant energy by various substances. For example, stated more succinctly, the field of spectroscopy encompasses the analysis of the spectrum of light such as, for example, the chemical analysis of flames which may be emitted from rocket exhausts or the study of reflected light from painted surfaces in order to analyze the paint.

Emission spectra are produced when radiant energy from matter, excited by various forms of energy is passed through a slit and subsequently separated into its various components or wavelengths either by refraction in a transparent prism or by diffraction from a ruled grating or a crystalline solid. The production of absorption spectra involves use of similar devices except that the excitation source is replaced by a suitable radiant energy source some light from which is absorbed by a sample placed between it and the source. Spectroscopic measurements of wavelengths and intensities of electromagnetic radiation are made using instruments called spectroscopes, spectrographs, spectrometers, or spectrophotometers.

Interpretation of spectra provides information concerning atomic and molecular energy levels, electronic configurations of atoms and ions, molecular geometries, and chemical bonds. Empirical correlations of spectral characteristics with chemical and physical properties of matter provide a basis for qualitative and quantitative chemical analysis. The form of spectroscopy which has been found very useful in a number of situations is known as Fourier spectroscopy. The Fourier spectrometers in use today, which are utilized to provide spectroscopic measurements and information, have certain drawbacks which render them less useful than they might be.

For example, a typical spectrometer such as the Michelson Fourier spectrometer generally encompasses a plurality of moving parts, large size, cannot be linked together in a series or array, and cannot be coupled to optical fibers. Therefore, it would be highly desirable to provide a spectrometer which overcomes the above problems encountered with current spectrometers and therefore greatly improve the field of spectroscopy.

SUMMARY OF THE INVENTION

The fiber Fourier spectrometer of the present invention overcomes the problems set forth hereinabove by providing a spectrometer with greatly increased sensitivity and which substantially eliminates the problems associated and inherent with past spectrometers.

The fiber Fourier spectrometer of this invention includes a focusing lens, a beam splitter, a pair of monomode optical fibers, an electro-optic block of material which defines therein a pair of optical paths of substantially equal length, means for varying the effective length of one of the optical paths within the electro-optic block of material, and a detector for detecting the output intensity. The unique relationship between the above components of the spectrometer of the present invention produces a substantially improved spectrometer.

The focusing lens focuses electromagnetic radiation emanating from a source to a point. The beam splitter located within the path of the converging beam of electromagnetic radiation allows a portion of the radiation to pass therethrough to the focus point while reflecting another portion of the radiation to focus at another point. The electromagnetic radiation at each of the two focal points is coupled into the ends of the pair of monomode optical fibers of substantially equal length, respectively. It is necessary with this invention to utilize monomode optical fibers, that is, fibers which can transmit only one mode, so that the output of each of the fibers will represent an integration over phase of the input. In other words, the output of the monomode fiber is a wave of a single phase only even though the phase of the incoming electromagnetic radiation may vary spatially.

Each monomode fiber is optically connected by optical couplers or the like to respective ends of the pair of optical paths formed within the electro-optic block of material. Consequently, each of the incoming beams travel paths of substantially equal length. A variable electric field is applied to one of the two optical paths in the electro-optic material in order to alter the effective path length of that particular path. In other words, the phase of one of the two waves of the two incoming beams which pass through the electro-optic material is selectively retarded prior to recombining within the electro-optic material. The two waves may recombine constructively or destructively, depending upon the relative phases, in order to emit a large or small signal at the detector which receives the output of the recombined waves of electromagnetic radiation.

Because of the different wavelengths within the electromagnetic source, the spectral components of the source are phase-retarded by different amounts and can be analyzed, as in conventional Fourier spectroscopy, by interference in a manner described by W. H. Steel in "Interferometry", Cambridge at the University Press, 1967. Since collected intensity is utilized within this invention, the entire signal is received by the detector rather than being spread over an area for examination of fringes. This results in a substantially greater sensitivity than possible with prior art spectrometers. In addition, the electronic method of varying the effective length of one of the optical paths, and, therefore the phase, is substantially faster and more precise than mechanical methods utilized in the past.

It is therefore an object of this invention to provide a fiber Fourier spectrometer which has greatly increased sensitivity.

It is another object of this invention to provide a fiber Fourier spectrometer which eliminates the use of moving parts and relies wholey upon electronic control.

It is a further object of this invention to provide a fiber Fourier spectrometer which is extremely small in size.

It is still another object of this invention to provide a fiber Fourier spectrometer which is capable of being interconnected with other such spectrometers in an array of spectrometers.

It is still a further object of this invention to provide a fiber Fourier spectrometer which can be coupled to optical fibers.

It is still a further object of this invention to provide a fiber Fourier spectrometer which is economical to produce and which utilizes conventional, currently available components that lend themselves to standard mass producing manufacturing techniques.

For a better understanding of the present invention, together with other and further objects thereof, reference is made to the following description taken in conjunction with the accompanying drawing and its scope will be pointed out in the appended claims.

DETAILED DESCRIPTION OF THE DRAWING

The only Figure of the drawing is a schematic representation of the fiber Fourier spectrometer of this invention

DETAILED DESCRIPTION OF THE PREFERRED EMBODIMENT

Reference is now made to the only FIGURE of the drawing which illustrates schematically the fiber Fourier spectrometer 10 of this invention. A major component of spectrometer 10 of the present invention is a block 12 of electro-optic material such as lithium niobate in which is formed a pair of optical paths 14 and 16 of substantially the same length. Optical paths 14 and 16 are formed by means of any suitable diffusion technique and combine to form a single optical path 18 thereby forming an overall Y-shaped configuration. The Y-shape provides first optical path 14, second optical path 16, with these optical paths 14 and 16 combining into optical path 18.

An end of each optical path 14 and 16 has coupled thereto by any suitable coupling means such as optical couplers or an adhesive such as epoxy 17, an independent monomode optical fiber 20 and 22, respectively. An example of such a monomode optical fiber is set forth in U.S. Pat. No. 4,089,586 issued on May 16, 1978. The present invention incorporates monomode fibers 20 and 22 therein since it is essential to pass only a single mode of electromagnetic radiation through optical paths 14 and 16 formed within electro-optic block of material 12. The length of each of the monomode optical fibers 20 and 22 are also made substantially equal.

Operably associated with one of the paths (designated as optical path 16 in the drawing) is a means for applying a variable electric field thereto in order to alter the effective optical path length of that particular optical path 16. Such effective length altering means may take the form of a pair of electrodes 24 and 26 positioned adjacent optical path 16 and electrically connected to any suitable variable, controllable voltage source 28.

Continuing the description of the fiber Fourier spectrometer 10 of this invention, any suitable focusing lens 30 is optically aligned with a beam splitter 32 in the form of, for example, a partial reflector in order to converge and focus an incoming beam 33 of electromagnetic radiation to the ends 34 and 36 of monomode optical fibers 20 and 22, respectively, in a manner to be described in detail hereinbelow. In addition, any suitable intensity detector 38 such as a photocell or intensity cell is optically aligned with the output end of optical path 18 formed within electro-optic material 12. For optimum results with spectrometer 10 of this invention any conventional optical fiber 40 may be coupled by, for example, epoxy 17 to the end of optical path 18 so as to direct the output therefrom directly into intensity detector 40.

MODE OF OPERATION OF THE PREFERRED EMBODIMENT

During operation of the fiber Fourier spectrometer 10 of this invention, electromagnetic radiation from any suitable multiple wavelength source 42, such as for example, the flame of a rocket exhaust, is focused to a point (shown at as an end 36 of monomode fiber 16) by lens 30. The partially-reflecting mirror (beamsplitter) 32 optically interposed within the converging beam 35 of electromagnetic radiation allows a portion 37 of the electromagnetic radiation to pass therethrough and to be focused onto end 36 of monomode optical fiber 22 while it reflects another portion 39 of electromagnetic radiation to focus on end 34 of monomode optical fiber 20. The electromagnetic radiation focused at these points is thereby inserted into the respective ends of fibers 20 and 22. This method of dividing a beam of electromagnetic radiation is more commonly referred to as "division of amplitude" as pointed out in Born et al., *Principles of Optics,* 2nd (revised) edition, the MacMillan Company, New York, 1964, p. 256.

The phase of the electromagnetic radiation collected from source 42 may vary spatially. Monomode optical fibers 20 and 22, however, are capable of transmitting in only one mode, and, therefore, the output from each fiber 20 and 22 entering optical paths 14 and 16, respectively, within electro-optic block of material 12 represents an integration over phase of the input, that is, a wave of only a single phase. In other words, no spatial information appears in the output of monomode optical fibers 20 and 22.

The outputs from optical fibers 20 and 22 are compared by selectively retarding the phase of one of the two waves and then recombining the waves. This is accomplished by providing the pair of electrodes 24 and 26, adjacent one of the optical paths 16 within electro-optic block of material 12 electrically connected to a variable voltage controller 28 in order to selectively control the voltage between electrodes 24 and 26. By controlling the voltage between electrodes 24 and 26, the effective length of optical path 16 may be varied accordingly, thereby selectively retarding the phase of the wave of electromagnetic radiation passing through optical path 16 with respect to the wave passing through optical path 14. Thereafter, the two waves passing through paths 14 and 16 recombine constructively or destructively in optical path 18, depending upon the relative phases of the two waves. The resultant output intensity through optical fiber 40 to detector 30 would therefore either be a large or small signal received by detector 38 in accordance with either a contructive or destructive recombining of the waves.

Because of the different wavelengths of source 42, the spectral components thereof which are phase-retarded by different amounts in the manner indicated above can be easily analyzed in a conventional Fourier spectroscopy technique, by interference in the manner described by W. H. Steel in "Interferometry" cited above. Since collected intensity is utilized with the present invention, the entire signal is received by detector 38 rather than being spread over an area for examination of fringes as with past spectrometers. Consequently, the sensitivity achieved by this invention is substantially greater than with prior art devices. In addition, the electronic procedure for varying the effective path lengths and therefore the phase of one of the beams is also faster and more precise than with prior mechanical apparatus.

Although the invention has been described with reference to a particular embodiment, it will be understood that this invention is also capable of further and other embodiments within the spirit and scope of the appended claims.

We claim:

1. A fiber Fourier spectrometer comprising:
   means for receiving an output of electromagnetic radiation, amplitude dividing said output of electromagnetic radiation into a first beam and a second beam of electromagnetic radiation, and focusing said first beam to a first preselected point and said second beam to a second preselected point;
   means optically aligned with said first beam and said second beam of electromagnetic radiation for receiving said first and said second beams of electromagnetic radiation and passing therethrough only a single mode from each of said beams of electromagnetic radiation;
   means optically aligned with said single mode passing means for defining a first beam path and a second beam path and for combining said first and second beam paths into a single output beam path whereby said first beam of electromagnetic radiation having only a single mode follows said first beam path and said second beam of electromagnetic radiation having only a single mode follows said second beam path prior to combining into a single output beam of electromagnetic radiation following said output beam path;
   means operably associated with only one of said first or said second beam paths for altering the phase of said beam of electromagnetic radiation following said one beam path prior to said first and second beams combining into said single output beam following said output beam path; and
   means optically aligned with said output beam path of said beam path defining means for receiving said single output beam and detecting varying intensities of said single output beam of electromagnetic radiation whereby said varying intensities can be utilized to analyze spectral components of said source of electromagnetic radiation by a Fourier spectroscopy technique.

2. A fiber Fourier spectrometer as defined in claim 1 wherein said single mode passing means comprises a first monomode optical fiber optically interposed between said first preselected focus point and said first beam path and a second monomode optical fiber optically interposed between said second focus point and said second beam path.

3. A fiber Fourier spectrometer as defined in claim 2 wherein said path defining means comprises a block of electro-optic material having said first, said second and said output beam paths formed therein.

4. A fiber Fourier spectrometer as defined in claim 3 wherein said first monomode optical fiber and said second monomode optical fibers are of substantially equal length.

5. A fiber Fourier spectrometer as defined in claim 4 wherein said first beam path and said second beam path are of substantially equal length.

6. A fiber Fourier spectrometer as defined in claim 5 wherein said beam phase altering means comprises means for altering the effective length of said one beam path.

7. A fiber Fourier spectrometer as defined in claim 6 wherein said effective path length altering means comprises a pair of electrodes adjacent said one beam path and means electrically connected to said pair of electrodes for providing a controlled voltage to said electrodes.

8. A fiber Fourier spectrometer as defined in claim 7 wherein said means for receiving said output of electromagnetic radiation, dividing said output of electromagnetic radiation into said first beam and said second beam and focusing said beams comprises a focusing lens and a beamsplitter.

9. A fiber Fourier spectrometer as defined in claim 8 wherein said electro-optic material is lithium niobate.

10. A fiber Fourier spectrometer as defined in claim 9 wherein said intensity receiving and detecting means comprises a photocell.

* * * * *